Feb. 5, 1935.  W. H. PHILLIPS  1,990,309
VALVE CONSTRUCTION
Filed April 18, 1932   3 Sheets-Sheet 1

Inventor:
William H. Phillips,
By Dyrenforth, Lee, Chritton & Wiles,
Attorneys.

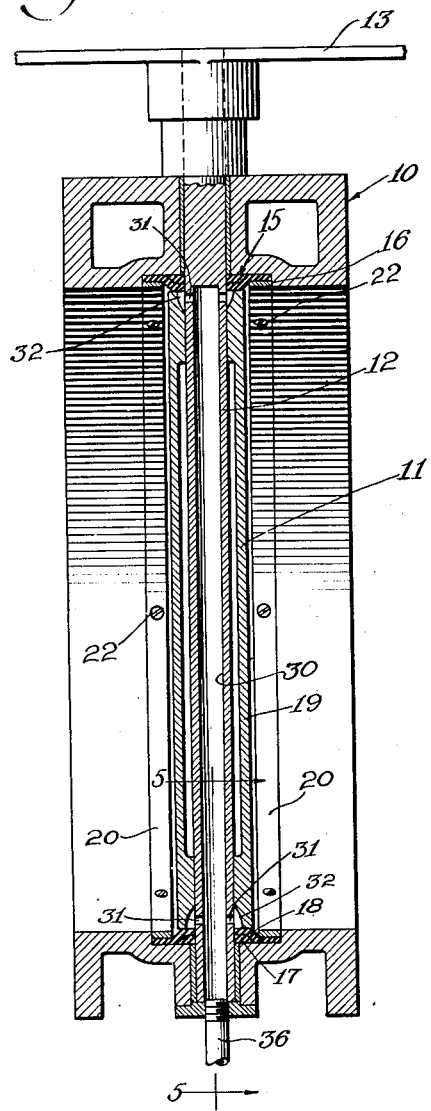
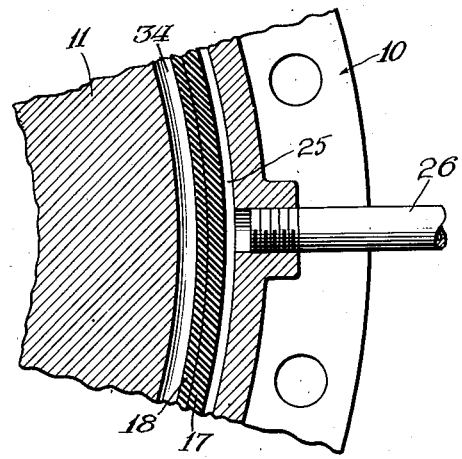
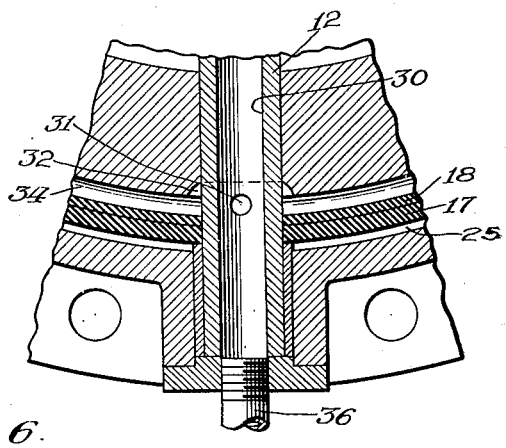
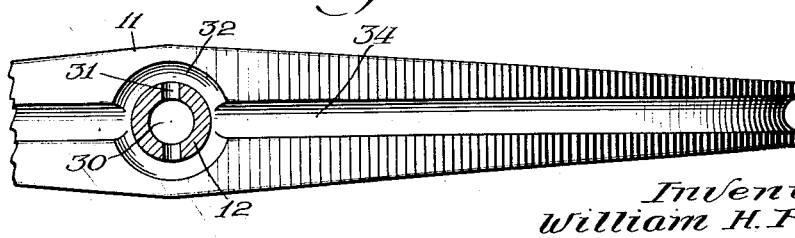

Feb. 5, 1935.  W. H. PHILLIPS  1,990,309
VALVE CONSTRUCTION
Filed April 18, 1932   3 Sheets-Sheet 3
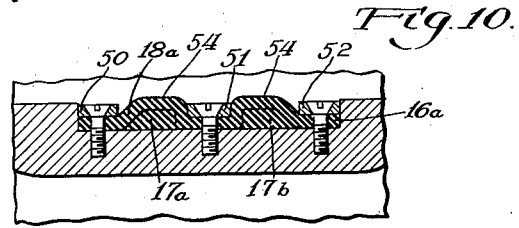
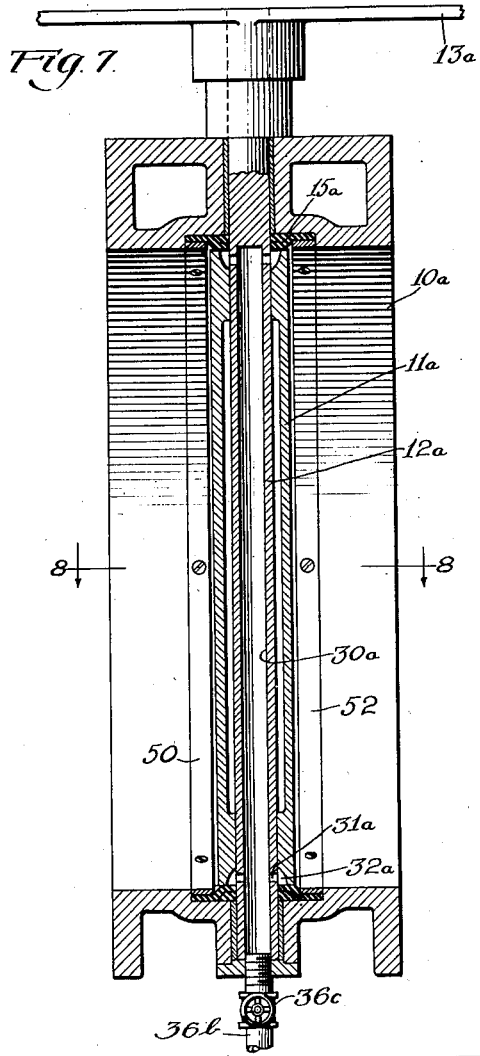
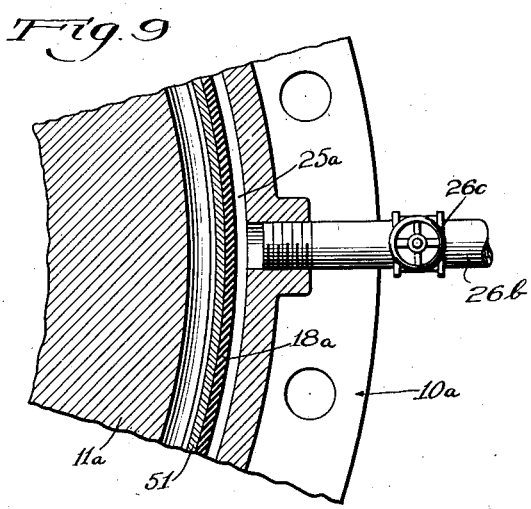
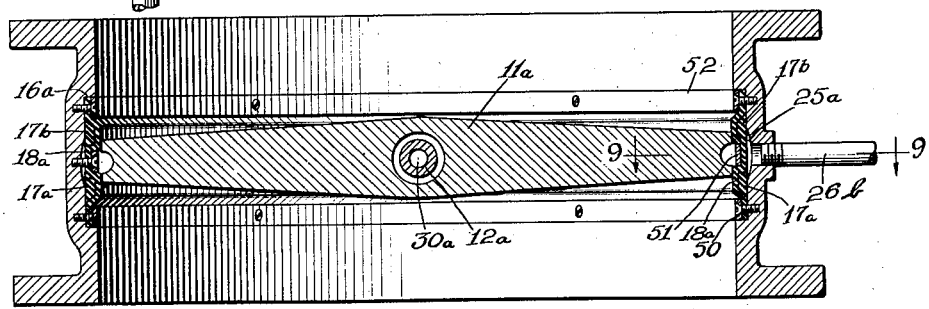
Inventor:
William H. Phillips,
By Dyrenforth, Lee, Chritton & Wiles,
Attorneys.

Patented Feb. 5, 1935

1,990,309

UNITED STATES PATENT OFFICE 1,990,309

VALVE CONSTRUCTION

William H. Phillips, Oak Park, Ill., assignor to Henry Pratt Co., a corporation of Illinois Application April 18, 1932, Serial No. 606,024

2 Claims. (Cl. 251—11)

The invention relates to valve construction and is particularly adapted to be employed in valves of the butterfly type.

A particular object of the invention is to provide an improved valve of the kind described which may be connected in a pipe line, or the equivalent, and will, in its closed position, effectively stop the flow of fluids through the pipe line even though the fluids are under a relatively high pressure.

One form of the invention is embodied in a butterfly valve which comprises a valve casing, a valve disc pivoted in the casing, and an annular valve seat of resilient material, preferably rubber, which engages the periphery of the valve disc when it is in its closed position. Means is provided for subjecting the outer surface of the valve seat to a pressure which is higher than the pressure in the pipe line so that the valve seat is urged against the valve disc. An annular groove is formed in the seat-engaging edge of the valve disc and fluid under a relatively high pressure is supplied to the annular groove through a valve stem which carries the valve disc. The fluid pressure in the annular groove is preferably higher than the pressure in the pipe line. Any leakage, when the valve disc is in its closed position, will be leakage of high pressure fluid into the pipe-line and not leakage of the fluid in the pipe-line past the valve.

The improved construction is particularly advantageous when the valve is employed in pipe lines through which there is a flow of poisonous or obnoxious gases as these gases cannot leak past the valve when it is in its closed position.

Other objects and advantages will become apparent as the following detailed description progresses, reference being had to the accompanying drawings, wherein Figure 1 is an elevation, partly in section, of a valve which embodies the invention.

Fig. 3 is a section taken on line 3—3 of Fig. 1.

Fig. 4 is an enlarged fragmentary section taken on line 4—4 of Fig. 2.

Fig. 5 is an enlarged fragmentary section taken on line 5—5 of Fig. 3.

Fig. 6 is an enlarged section taken on line 6—6 of Fig. 1, the casing of the valve being omitted to illustrate certain details of the valve disc.

Fig. 7 is a central longitudinal section taken through a butterfly valve which embodies another form of the invention.

Fig. 8 is a section taken on line 8—8 of Fig. 7.

Fig. 9 is an enlarged fragmentary section taken on line 9—9 of Fig. 8, and

Fig. 10 is an enlarged fragmentary section taken on the same line as Fig. 8.

Figure 1:
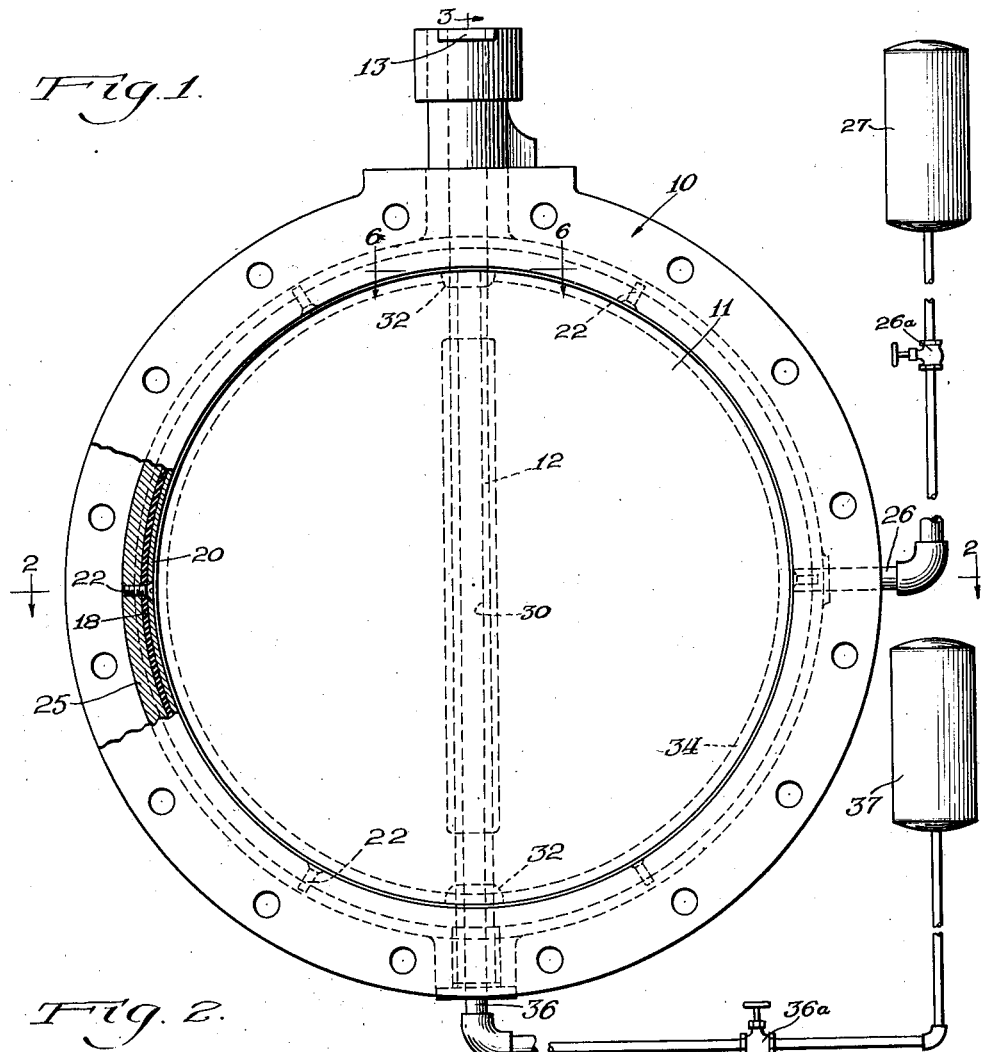
Figure 2:
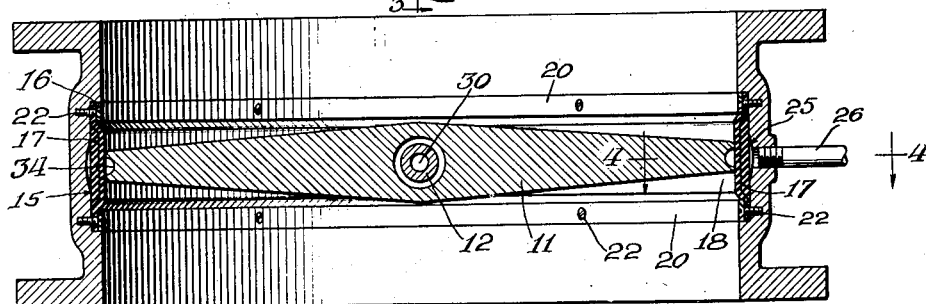
Fig. 2 is a section taken on line 2—2 of Fig. 1.

Referring for the present to Figures 1 to 6, inclusive, wherein a preferred embodiment of the invention is illustrated, the reference character 10 designates generally the casing of a butterfly valve which comprises a valve disc 11 mounted on a valve stem 12, the valve stem 12 being pivotally journaled in the casing 10. As best shown in Figures 1 and 3, the upper end of the valve stem 12 projects from the casing 10 and is provided with a lever or handle 13 whereby the valve stem may be angularly displaced to open or close the valve disc 11.

The valve disc 11 co-operates with a valve seat which is preferably formed of resilient material and is designated generally by the reference character 15. It will be noted that the valve seat 15 is seated in an annular groove 16 formed in the casing 10. The valve seat 15 is preferably formed of rubber and preferably of that type of rubber which is known to the trade as "linatex". The valve seat 15 is preferably formed of two annular members, one annular member being identified by the reference character 17 and serving as a pad under the second member which is identified by the reference character 18. It will be noted that the pad member 17 is approximately as wide as the diameter of a hub 19 formed on the valve disc 11 to accommodate the valve stem 12. The annular member 18 is wider than the member 17 and its marginal portions extend beyond the member 17 so that they may be clamped by metallic rings 20 in the bottom of the annular groove 16. The metallic rings 20 are secured to the casing 10 by screws 22, or the equivalent.

It is readily understood that when the valve disc 11 is in its closed position, it compresses the annular seat members 17 and 18 and tends to form a fluid-tight seal to prevent the leakage of fluid through the casing.

In this instance, the valve casing 10 is provided with an annular shallow groove 25 which extends substantially entirely around the inner surface of the casing 10, the shallow groove 25 being disposed directly beneath the seat member 17. Screw-threaded into the casing 10 and communicating with the shallow groove 25 is a pipe 26 which connects the shallow groove to any suitable source of fluid under pressure. Thus I have shown a water tank 27 which is disposed a suitable distance above the valve to give the desired pressure to the water. Any suitable means (not shown) may be provided for supplying water to the tank or for maintaining a predetermined pressure therein. When the valve disc 11 is in its closed position and the valve seat members 17 and 18 are subjected to the pressure of the water in the tank 17 through the medium of the pipe 26 and the shallow groove 25, the valve seat member 18 will be urged against the edge of the valve disc so that a more effective seal will be formed by them.

In some instances the shallow groove 25 may be omitted and the pipe 26 may discharge its contents directly against the valve seat member 17 so that the liquid under pressure may work its way around the member 17 and hold it a slight distance away from the bottom of the groove 16.

As best shown in Figures 3, 5 and 6, the valve stem 12 is provided with a central bore 30 which extends from its bottom end to a point adjacent its upper end. A plurality of ports 31 formed in the valve stem communicate with the bore 30 and with an annular groove 34 which extends around the entire periphery of the valve disc, the groove 34 being alined with the valve seat members 17 and 18 when it is in its closed position. At those points where the valve stem 11 projects from the valve disc, the annular groove 34 divides and encircles the valve stem. This is shown at 32 in Figure 6.

Screw-threaded into the lower end of the bore 30 is a pipe 36 which may be connected to the tank 27 if it is so desired. In this instance, the pipe 30 is connected to a second tank 37 which is also adapted to hold a supply of water so that water under relatively high pressure will flow through the pipe 36 into the bore 30 and thence through the ports 31 into the annular groove 34. The pressure of the liquid in the groove 34 is preferably higher than the pressure of the liquid controlled by the valve.

It will be readily understood that the pressure to which the valve seat 15 is subjected by the liquid in the groove 34 insures that a fluid-tight seal will be formed between the valve disc and its seat as far as the fluid controlled by the valve is concerned. In other words, if the fluid controlled by the improved valve contains a poisonous gas such as carbon dioxide, or the like, it is obvious that the gas cannot leak by the closed valve as any leakage between the valve disc and its seat will be leakage of water from the groove 34 into the valve casing. Therefore, when the valve disc is in its closed position, the pipe beyond the valve may be removed or repaired without danger to the workmen.

The flow of liquid through the pipe 26 and 36 may be controlled by valves 26a and 36a, respectively. In some instances, it may be desirable to omit the pipe 26 and the tank 27 and in other instances it may be desirable to omit the pipe 36 and the tank 37. However, where it is essential that there shall not be the slightest leakage through the valve, it is obvious that the pressure in the shallow groove 25 may be maintained higher than the pressure in the groove 34 so that the seat member 15 will be urged firmly against the valve disc when it is in its closed position. The pressure in the groove 34 will be maintained higher than the pressure of the fluid which is controlled by the valve. Under these conditions, all leakage will be leakage of the water in the groove 34 into the valve casing.

Referring now to Figures 7 to 10, inclusive, wherein another form of the invention is illustrated, the reference character 10a designates generally the casing of a butterfly valve which comprises a valve disc 11a mounted on a valve stem 12a which is journaled in the casing 10a. The valve casing 10a, the valve disc 11a, and the valve stem 12a are substantially identical in construction with the valve 10, the valve disc 11 and the valve stem 12, respectively, described above. The valve stem 12a is provided with a lever or handle 13a whereby the valve stem may be angularly displaced to open and close the valve disc. The valve disc 11a is adapted to seat on a valve seat 15a which is preferably formed from resilient material such as "linatex". The valve seat 15a is formed of an annular member 18a which is engageable by the valve disc and overlies two pad-like members 17a and 17b. It is understood, of course, that the members 17a, 17b and 18a are all preferably formed of "linatex". The members 17a and 17b are annular in form and are spaced longitudinally from each other. The inner surface of the casing 10a is provided with a groove 16a which accommodates the seat members 17a, 17b and 18a. The central portion of the annular member 18a and the outer marginal portions thereof are clamped to the bottom surface of the groove 16a by annular members 50, 51 and 52, the member 51 being preferably split as it engages the central portion of the member 18a and must permit the valve stem 12a to pass through the seat as best shown in Figure 7.

The construction of the valve seat 15 is such that two spaced annular surfaces 54 are provided for engagement with the valve disc 11a which is provided with an annular groove 32a corresponding to the groove 32 described above in connection with Figures 1 to 6, inclusive.

The valve stem 12a is provided with a central bore 30a identical with the bore 30 described above. Ports 31a connect the bore 30a with the groove 32a. A pipe 36b screwed into the lower end of the bore 30a connects the bore 30a with any suitable source of fluid under pressure such as a tank (not shown) corresponding to the tank 37 described above.

The bottom surface of the groove 16a is provided with a shallow groove 25a so that fluid under pressure may be forced into it to urge the valve seat 15a into firm engagement with the valve disc when it is in its closed position. A pipe 26b communicates with the groove 25a and with a tank (not shown) which corresponds to the tank 27 described above and has the same function. Valves 26c and 36c are provided in the pipes 26b and 36b, respectively.

Obviously, the valve shown in Figures 7 to 10, inclusive, will function in substantially the same manner as the valves shown in Figures 1 to 6, inclusive. It is readily understood that the valves 36a and 36c should be closed when the valve discs 11 and 11a are in their open positions.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

I claim:

1. A butterfly valve comprising a valve casing, a valve stem journaled in said casing and provided with a passage therein, a one piece valve disc mounted on said valve stem and provided with a groove extending around its seat-engaging edge, said seat-engaging edge being divided into two annular portions by said groove, an annular valve seat of resilient material disposed in said casing and having a groove in its inner surface adapted to be alined with the groove in said valve disc when said valve disc is in its closed position, means for forcing fluid under pressure through said passage into the groove in said valve disc, and means for forcing fluid under pressure into the groove in said valve seat to expand said valve seat.

2. A butterfly valve comprising a valve casing, a valve stem journaled in said casing and having a passage therethrough, a one piece valve disc mounted on said valve stem and provided with an annular groove extending around its periphery, said groove communicating with said passage, a valve seat of resilient material secured in said casing and engageable by said grooved periphery of said valve disc, a fluid supply to force fluid under pressure through said passage into said groove and against the surface of said valve seat in contact with the periphery of the valve disc, and pressure fluid means for urging said seat against said valve disc when said valve disc is in its closed position.

WILLIAM H. PHILLIPS.